(12) United States Patent
Kim et al.

(10) Patent No.: US 12,313,404 B2
(45) Date of Patent: May 27, 2025

(54) METHOD AND APPARATUS FOR CALCULATING ACTUAL DISTANCE BETWEEN COORDINATES IN IMAGE

(71) Applicant: 3i Inc., Daegu (KR)

(72) Inventors: Ken Kim, Seoul (KR); Ji Wuck Jung, Gyeonggi-do (KR); Kevin Nathanael Santoso, Seoul (KR); Byung Ju Lee, Seoul (KR)

(73) Assignee: 3i Inc., Daegu (KR)

( * ) Notice: Subject to any disclaimer, the term of this patent is extended or adjusted under 35 U.S.C. 154(b) by 353 days.

(21) Appl. No.: 17/976,856

(22) Filed: Oct. 30, 2022

(65) Prior Publication Data

US 2023/0384091 A1 Nov. 30, 2023

(30) Foreign Application Priority Data

May 27, 2022 (KR) .......................... 10-2022-0065450

(51) Int. Cl.
| | |
|---|---|
| *G01C 11/04* | (2006.01) |
| *G01C 5/00* | (2006.01) |
| *G01C 11/06* | (2006.01) |
| *G06T 3/4038* | (2024.01) |
| *G06T 7/60* | (2017.01) |
| *G06T 7/62* | (2017.01) |
| *G06V 10/74* | (2022.01) |

(52) U.S. Cl.
CPC ............ *G01C 11/04* (2013.01); *G06T 3/4038* (2013.01); *G06T 7/62* (2017.01); *G06V 10/761* (2022.01)

(58) Field of Classification Search
CPC .......... G01C 11/04; G01C 5/00; G01C 11/06; G06T 3/4038; G06T 7/62; G06T 2207/20101; G06T 2207/30196; G06T 7/536; G06T 7/60; G06T 7/73; G06V 10/761; G06V 20/64; H04N 13/282
See application file for complete search history.

(56) References Cited

U.S. PATENT DOCUMENTS

| | | | |
|---|---|---|---|
| 8,818,132 B2* | 8/2014 | Zhang ....................... | G06T 7/80 |
| | | | 382/154 |
| 10,146,331 B2* | 12/2018 | Nishida ................ | G06F 3/0418 |
| 10,922,844 B2* | 2/2021 | Chang ....................... | G06T 7/70 |

(Continued)

FOREIGN PATENT DOCUMENTS

| | | | | |
|---|---|---|---|---|
| CN | 112232279 A | * | 1/2021 | ............. G06N 3/045 |
| JP | 2021189946 | | 12/2021 | |

(Continued)

*Primary Examiner* — Stephen R Koziol
*Assistant Examiner* — Joshua Chen
(74) *Attorney, Agent, or Firm* — JCIPRNET

(57) ABSTRACT

In order to calculate an actual distance between coordinates in an image, a regular image for an original image may be generated based on an intrinsic parameter of a camera and pose information of the camera, based on first coordinates in the regular image that are received, first world coordinates corresponding to the first coordinates may be calculated in a world coordinate system, based on second coordinates in the regular image that are received, second world coordinates corresponding to the second coordinates may be calculated in the world coordinate system, and a distance between the first world coordinates and the second coordinates may be calculated.

6 Claims, 15 Drawing Sheets

(56) References Cited

U.S. PATENT DOCUMENTS

| | | | |
|---|---|---|---|
| 11,962,745 B2* | 4/2024 | Doyen | G06T 7/596 |
| 12,229,990 B2* | 2/2025 | Teng | G06V 10/24 |
| 2008/0015729 A1* | 1/2008 | Lin | B23H 7/30 |
| | | | 700/162 |
| 2014/0270479 A1* | 9/2014 | Berestov | G06T 7/41 |
| | | | 382/154 |
| 2021/0123732 A1* | 4/2021 | Wang | G01C 3/14 |

FOREIGN PATENT DOCUMENTS

| | | | |
|---|---|---|---|
| JP | 2021189946 A | * | 12/2021 |
| KR | 20210022995 | | 3/2021 |
| KR | 102278536 | | 7/2021 |
| KR | 20210149658 | | 12/2021 |
| KR | 20210149658 A | * | 12/2021 |

* cited by examiner

METHOD AND APPARATUS FOR CALCULATING ACTUAL DISTANCE BETWEEN COORDINATES IN IMAGE

CROSS-REFERENCE TO RELATED APPLICATION

This application claims the benefit of Korean Patent Application No. 10-2022-0065450 filed on May 27, 2022, at the Korean Intellectual Property Office, the entire disclosure of which is incorporated herein by reference for all purposes.

BACKGROUND

1. Field of the Invention

One or more example embodiments relate to a technology for providing an image to a user, and more particularly, to a method and apparatus for calculating an actual distance between coordinates in an image.

2. Description of the Related Art

The best way to record a three-dimensional (3D) space is to take 360-degree photos of the space, save the photos in the form of a 360-degree image, and connect the 360-degree images for each location in the form of a 3D tour. A user may visually view this 3D tour through a virtual reality (VR) viewer. However, because a 3D tour is merely a method that users may use to virtually see an image from their location, it is hard to say that a 3D tour realistically reflects actual lengths. Therefore, if a user desires to plan interior design or figure out furniture arrangement by considering actual lengths of a space presented by a 3D tour, a method of actually measuring lengths within the 3D tour, that is, a 360-degree image, is needed.

SUMMARY

Example embodiments provide a method and apparatus for calculating an actual distance indicated by a distance between two coordinates in an image.

According to an aspect, there is provided a method of calculating an actual distance between coordinates in an image, performed by an electronic apparatus including generating a regular image for an original image captured by a camera based on an intrinsic parameter of the camera and pose information of the camera, calculating, based on first coordinates in the regular image that are received, first world coordinates corresponding to the first coordinates in a preset world coordinate system, calculating, based on second coordinates in the regular image that are received, second world coordinates corresponding to the second coordinates in the world coordinate system, and calculating a distance between the first world coordinates and the second world coordinates.

The first coordinates and the second coordinates may be positioned in a bottom surface in the regular image.

The calculating of the first world coordinates may include receiving, from a user, the first coordinates in the regular image and calculating the first world coordinates in the world coordinate system corresponding to the first coordinates in response to the first coordinates being received, and the first world coordinates and the second world coordinates may have a same height and different plane positions.

The first coordinates may be positioned in a bottom surface in the regular image, and the second coordinates may be positioned in air above the bottom surface.

The calculating of the second world coordinates may include receiving, from a user, reference coordinates in the regular image together with a bottom surface shift input, calculating reference world coordinates in the world coordinate system corresponding to reference coordinates in response to the bottom shift input and the reference coordinates being received, outputting a user interface (UI) for receiving height information on a height of the reference world coordinates, receiving, from the user, the second coordinates indicating height information through the UI, and calculating the second world coordinates corresponding to the second coordinates, and the reference world coordinates and the second world coordinates may have a same plane position and different heights in the world coordinate system.

The first coordinates and the second coordinates may respectively be positioned in air above a bottom surface in the regular image.

The method may further include determining a vanishing point for the regular image and determining a bottom surface in the regular image based on the vanishing point.

The method may further include calculating, based on third coordinates in the regular image that are received, third world coordinates corresponding to the third coordinates in the world coordinate system and calculating an area of a geometric structure formed by the first world coordinates, the second world coordinates, and the third world coordinates.

The method may further include calculating, based on third coordinates and fourth coordinates in the regular image that are received, third world coordinates corresponding to the third coordinates and fourth world coordinates corresponding to the fourth coordinates in the world coordinate system and calculating a volume of a geometric structure formed by the first world coordinates, the second world coordinates, the third world coordinates, and the fourth world coordinates.

The original image may be a panorama image or a 360-degree image.

According to another aspect, there is provided an electronic apparatus for performing a method of calculating an actual distance between coordinates in an image including a memory configured to store a program that calculates an actual distance between coordinates in an image and a processor configured to execute the program, wherein the processor may be configured to generate a regular image for an original image captured by a camera based on an intrinsic parameter of the camera and pose information of the camera, calculate, based on first coordinates in the regular image that are received, first world coordinates corresponding to the first coordinates in a preset world coordinate system, calculate, based on second coordinates in the regular image that are received, second world coordinates corresponding to the second coordinates in the world coordinate system, and calculate a distance between the first world coordinates and the second world coordinates.

Additional aspects of example embodiments will be set forth in part in the description which follows and, in part, will be apparent from the description, or may be learned by practice of the disclosure.

According to example embodiments, a method and apparatus for calculating an actual distance indicated by a distance between two coordinates in an image may be provided.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
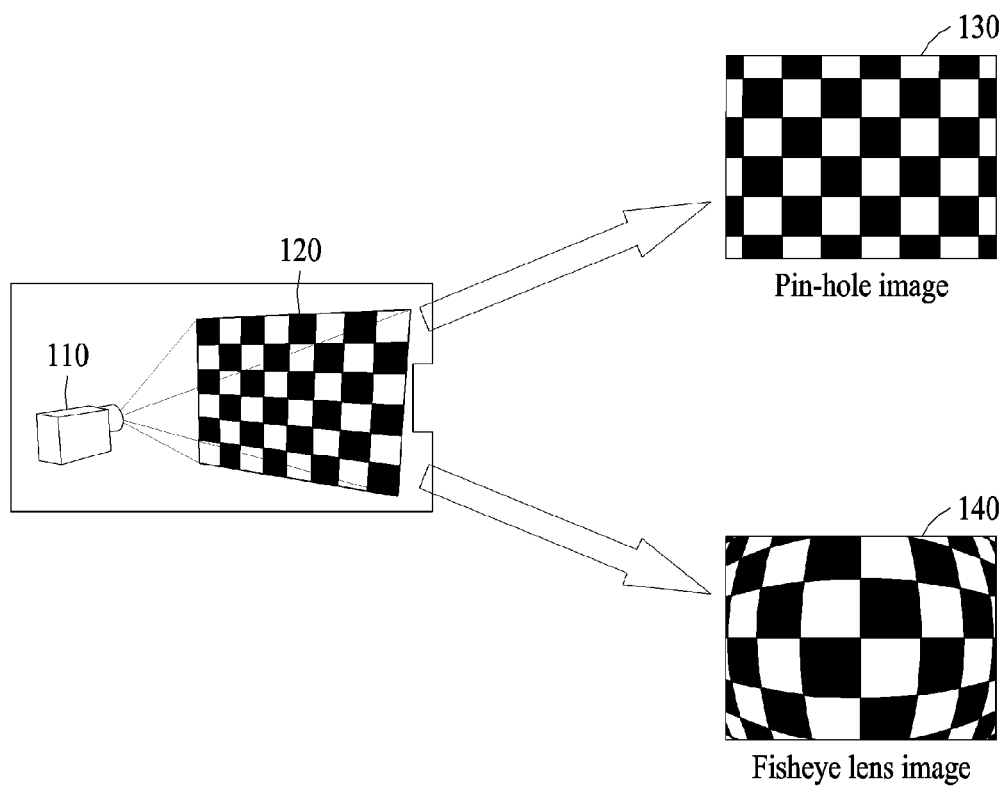
FIG. 1 illustrates images generated according to a type of camera lens according to an example embodiment.

Hereinafter, example embodiments will be described in detail with reference to the accompanying drawings. The scope of the right, however, should not be construed as limited to the example embodiments set forth herein. In the drawings, like reference numerals are used for like elements.

Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 illustrates images generated according to a type of camera lens according to an example embodiment.

According to an example embodiment, when a scene 120 is captured using a camera 110, images to be generated may vary depending on a type of lens of the camera 110. For example, a pin-hole image 130 generated using a pin-hole lens may represent the scene 120 with no distortion. As another example, a fisheye image 140 generated using a wide-angle lens such as a fisheye lens may represent the scene 120 with distortion.

For example, when an image is captured using a lens (e.g., a fisheye lens) of a wide-angle camera, the captured image may have radial distortion (barrel distortion) caused by a phenomenon in which a ray passing a point close to a center of a lens is bent more than a ray passing a point far from the center of the lens and tangential distortion caused by the lens and an image plane not being parallel during a camera manufacturing process. In order to perform post-processing using an original image captured using such a lens, a distortion effect produced by a lens may first need to be removed. For example, an image from which the distortion effect produced by the lens is removed may be referred to as a regular image. Coordinates of a pixel (or a point) appearing in the regular image may be converted into coordinates in a world coordinate system by matching a camera coordinate system and the world coordinate system after the regular image is expressed in the camera coordinate system.

Hereinafter, referring to FIG. 2, how to match the camera coordinate system and the world coordinate system is described in detail.

Figure 2:
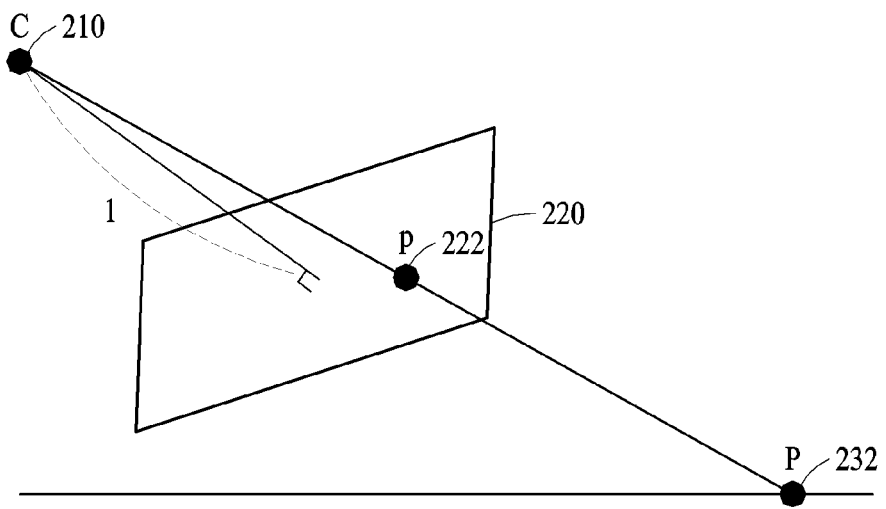
FIG. 2 illustrates coordinates of a point in a world coordinate system and coordinates of a point projected onto an image plane of a camera according to an example embodiment.

FIG. 2 illustrates coordinates of a point on a world coordinate system and coordinates of a point projected onto an image plane of a camera according to an example embodiment.

According to an example embodiment, a regular image 220 corresponding to an original image may be generated based on an intrinsic parameter of the camera 110 and pose information of the camera 110. The regular image 220 may be disposed on an image plane in a camera coordinate system. For example, the intrinsic parameter may include $f_x$ and $f_y$ indicating a focal length of a lens and include $c_x$ and $c_y$ indicating a principal point. For example, the pose information may be an extrinsic parameter and include rotation information and translation information.

According to an example embodiment, a target imaging point p 222 on the image plane may be defined at a target point P 232 in a three-dimensional (3D) space. Coordinates of the target point P 232 in the camera coordinate system may be expressed as $P_c$, and coordinates of the target point P 232 in the world coordinate system may be expressed as $P_w$. A transformation relationship between $P_c$ and $P_w$ may be expressed by Equation 1 below.

$$P_c = RP_w + t$$

$$P_w = R^T(P_c - t) \quad \text{[Equation 1]}$$

In Equation 1, R denotes the rotation information of the camera 110, and t denotes the translation information of the camera 110.

Pixel coordinates may need to be converted into regular coordinates to remove an effect of image distortion caused by the intrinsic parameter of the camera 110. For example, a transformation relationship between the pixel coordinates and the regular coordinates may be expressed by Equation 2 below.

$$u = (x - cx)/fx$$

$$v = (y - cy)/fy \quad \text{[Equation 2]}$$

Coordinates (x, y) of a target pixel in a pixel coordinate system may be converted into coordinates (u, v) of a target point in a regular coordinate system. Because an image plane of the regular image is a plane having a focal distance of 1 from a camera origin, the coordinates (u, v) of the target point in the regular image may correspond to coordinates (u, v, 1) of a target point in the camera coordinate system. The coordinates (u, v, 1) of the target imaging point in the camera coordinate system may be expressed as $p_c = (u, v, 1)$.

Next, when a point where a straight line connecting a camera origin 210 and $p_c$ 222 meets a bottom surface is obtained, ground coordinates of the target point P 232 in a desired 3D space may be calculated. The ground coordinates of the target point P 232 may need to be calculated in the world coordinate system not in the camera coordinate system. When coordinates of the camera origin 210 in the camera coordinate system are expressed as $C_c$, coordinates of the camera origin 210 in the world coordinate system are expressed as $C_w$, and coordinates corresponding to $p_c$ in the world coordinate system are expressed as $p_w$, $p_w$ and $C_w$ may be calculated through Equation 3 below. The coordinates of the camera origin in the camera coordinate system are (0, 0, 0). That is, $C_c = (0, 0, 0)$.

$$p_c = (u, v, 1)^T$$

$$C_c = (0, 0, 0)^T$$

$$p_w = R^T(p_c - t)$$

$$C_w = R^T(C_c - t) \quad \text{[Equation 3]}$$

Next, a point where a straight line connecting $C_w$ and $p_w$ in the world coordinate system meets the ground may be calculated. A point P on the straight line connecting $C_w$ and $p_w$ may be expressed by Equation 4 below.

$$P = C_w + k(p_w - C_w) \quad \text{[Equation 4]}$$

In the world coordinate system, because the ground has a z-axis value of "0", a "k" value may be calculated so that a z-coordinate of $C_w + k(p_w - C_w)$ is "0". When the calculated "k" value is applied to Equation 4, the ground coordinates of the target point P may be calculated. For example, the ground coordinates of the target point P may vary depending on how the world coordinate system is set.

Through the above-described processes, target coordinates in the world coordinate system corresponding to the coordinates of the target pixel in the original image or the regular image may be calculated. Since an actual distance may be expressed in the world coordinate system, an actual distance corresponding to a distance between two coordinates in an image may be calculated by calculating a distance between two coordinates in the world coordinate system.

Figure 3:
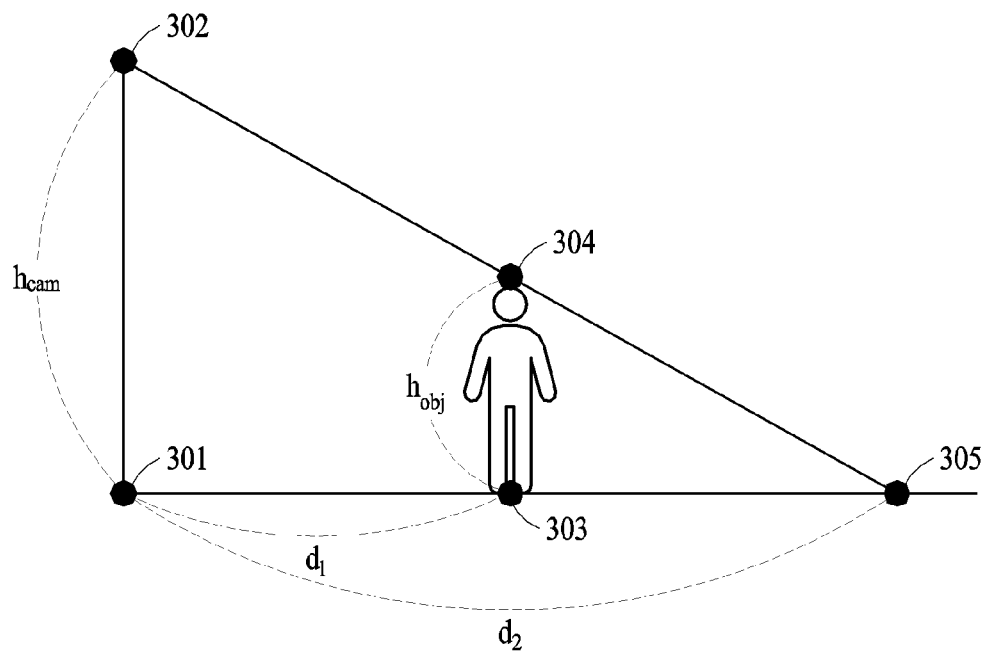
FIG. 3 illustrates a method of calculating a height of an object positioned in a vertical direction on a ground according to an example embodiment.

FIG. 3 illustrates a method of calculating a height of an object positioned in a vertical direction on a ground according to an example embodiment.

The method of calculating a distance described above with reference to FIG. 2 may be used to calculate an actual height of an object appearing on an image. A camera may be positioned at a second point 302 at a distance of $h_{cam}$ from a first point 301 on a ground. A distance "$d_1$" between the first point 301 and a point 303 on the ground at which an object is positioned and a distance "$d_2$" between the first point 301 and a point 305 at which a straight line connecting the second point 302 and a top end of the object meets the ground may be obtained. In this example, the actual height $h_{obj}$ of the object may be calculated by $h_{cam} \times (d_2 - d_1)/d_2$.

According to an example embodiment, a method of measuring the actual height of the object using the above-described method may be used to calculate the height of the object based on first coordinates indicating the ground or a bottom surface in an image received from a user and second coordinates indicating the top end of the object in the image. However, in some cases, a distance between the first coordinates and coordinates (i.e., a point at which the second coordinates are projected onto the bottom surface) of the bottom surface corresponding to the second coordinates may be calculated.

A method of measuring a distance between new coordinates to resolve the above-mentioned issue may be introduced. Hereinafter, a method of calculating an actual distance between coordinates in an image is described in detail with reference to FIGS. 4 through 9.

Figure 4:
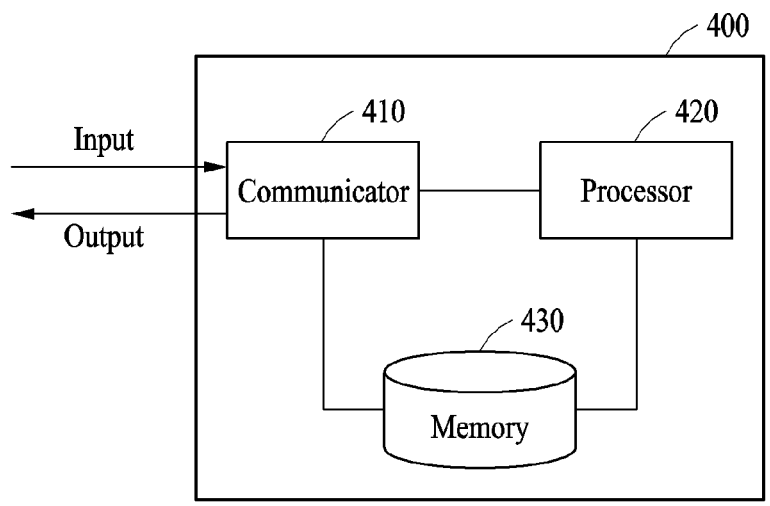
FIG. 4 is a diagram illustrating a configuration of an electronic apparatus according to an example embodiment.

FIG. 4 is a diagram illustrating a configuration of an electronic apparatus according to an example embodiment.

An electronic apparatus 400 may include a communicator 410, a processor 420, and a memory 430. The electronic apparatus 400 may be a personal computer (PC), a mobile apparatus, and a smartphone, but examples are not limited thereto.

The communicator 410 may be connected to the processor 420 and the memory 430 and transmit and receive data to and from the processor 420 and the memory 430. The communicator 410 may be connected to another external apparatus and transmit and receive data to and from the external apparatus. Hereinafter, transmitting and receiving "A" may refer to transmitting and receiving "information or data indicating A."

The communicator 410 may be implemented as circuitry in the electronic apparatus 400. For example, the communicator 410 may include an internal bus and an external bus. As another example, the communicator 410 may be an element that connects the electronic apparatus 400 to the external apparatus. The communicator 410 may be an interface. The communicator 410 may receive data from the external apparatus and transmit the data to the processor 420 and the memory 430.

The processor 420 may process the data received by the communicator 410 and data stored in the memory 430. A processor may be a hardware-implemented data processing apparatus having a physically structured circuit to execute desired operations. The desired operations may include, for example, code or instructions included in a program. The hardware-implemented data processing apparatus may include, for example, a microprocessor, a central processing unit (CPU), a processor core, a multi-core processor, a multiprocessor, an application-specific integrated circuit (ASIC), and a field-programmable gate array (FPGA).

The processor 420 may execute computer-readable code (e.g., software) stored in a memory (e.g., the memory 430) and instructions triggered by the processor 420.

The memory 430 may store the data received by the communicator 410 and data processed by the processor 420. For example, the memory 430 may store the program (or an application, or software). The stored program may be a set of syntaxes that are coded and executable by the processor 420 to calculate an actual distance between coordinates in an image.

The memory 430 may include, for example, at least one volatile memory, non-volatile memory, random-access memory (RAM), flash memory, a hard disk drive, and an optical disc drive.

The memory 430 may store an instruction set (e.g., software) for operating the electronic apparatus 400. The instruction set for operating the electronic apparatus 400 may be executed by the processor 420.

The communicator 410, the processor 420, and the memory 430 are described in detail below with reference to FIGS. 5 through 9.

Figure 5:
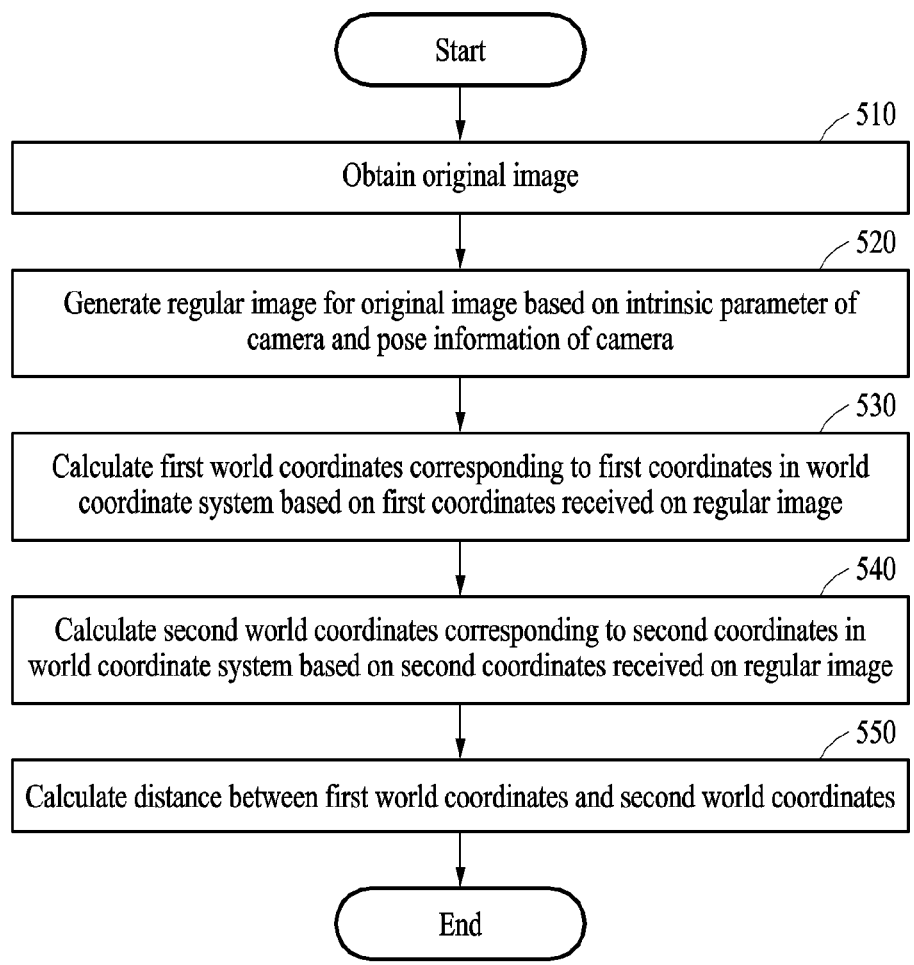
FIG. 5 is a flowchart illustrating a method of calculating an actual distance between coordinates in an image according to an example embodiment.

FIG. 5 is a flowchart illustrating a method of calculating an actual distance between coordinates in an image according to an example embodiment.

Following operations 510 through 550 may be performed by the electronic apparatus 400 described above with reference to FIG. 4.

In operation 510, the electronic apparatus 400 may obtain an original image. For example, the original image may be an image generated by a camera. For example, the original image may be a panorama image. As another example, the original image may be a 360-degree image.

In operation 520, the electronic apparatus 400 may generate a regular image from the original image captured by the camera based on an intrinsic parameter of the camera that generates the original image and pose information of the camera. For example, the regular image may be an image that is based on the original image from which distortion caused by a camera lens is removed and may be positioned on an image plane of the camera.

According to an example embodiment, the regular image may be generated based on the original image using the method described above with reference to FIG. 2.

In operation 530, the electronic apparatus 400 may calculate first world coordinates corresponding to first coordinates in a world coordinate system based on first coordinates in the regular image that are received. For example, the world coordinate system may be preset.

For example, the electronic apparatus 400 may output the regular image to a user and receive coordinates in the regular image. As another example, the electronic apparatus 400 may output the original image to the user and receive coordinates in the original image. The electronic apparatus 400 may convert the received coordinates in the original image into the first coordinates in the regular image.

According to an example embodiment, the first coordinates may be positioned in a bottom surface (or a ground) in the regular image. That is, the first coordinates may be coordinates positioned in the bottom surface.

According to another example embodiment, the first coordinates may be coordinates positioned in air above the bottom surface in the regular image. A method of receiving the coordinates positioned in the air above the bottom surface in the regular image is described in detail with reference to FIG. 9 below.

In operation 540, the electronic apparatus 400 may calculate second world coordinates corresponding to second coordinates in the world coordinate system based on second coordinates in the regular image that are received.

According to an example embodiment, the second coordinates may be positioned in the bottom surface of the regular image. That is, the second coordinates may be coordinates positioned in the bottom surface.

According to another example embodiment, the second coordinates may be coordinates positioned in the air above the bottom surface in the regular image.

In operation 550, the electronic apparatus 400 may calculate a distance between the first world coordinates and the second world coordinates.

According to an example embodiment, the electronic apparatus 400 may output the calculated actual distance on the regular image. For example, the electronic apparatus 400 may output a line connecting the first coordinates and the second coordinates and output the actual distance to be associated with the output line.

According to an example embodiment, after operation 550 is performed, following operations may be further performed. For example, the electronic apparatus 400 may perform an operation of calculating third world coordinates corresponding to third coordinates in the world coordinate system based on third coordinates in the regular image that are received. The electronic apparatus 400 may calculate an area of a geometric structure formed by the first world coordinates, the second world coordinates, and the third world coordinates.

According to an example embodiment, after the above-mentioned operations are performed, following operations may be further performed. For example, the electronic apparatus 400 may perform an operation of calculating fourth world coordinates corresponding to fourth coordinates in the world coordinate system based on fourth coordinates in the regular image that are received. The electronic apparatus 400 may calculate a volume of a geometric structure formed by the first world coordinates, the second world coordinates, the third world coordinates, and the fourth world coordinates.

Figure 6:
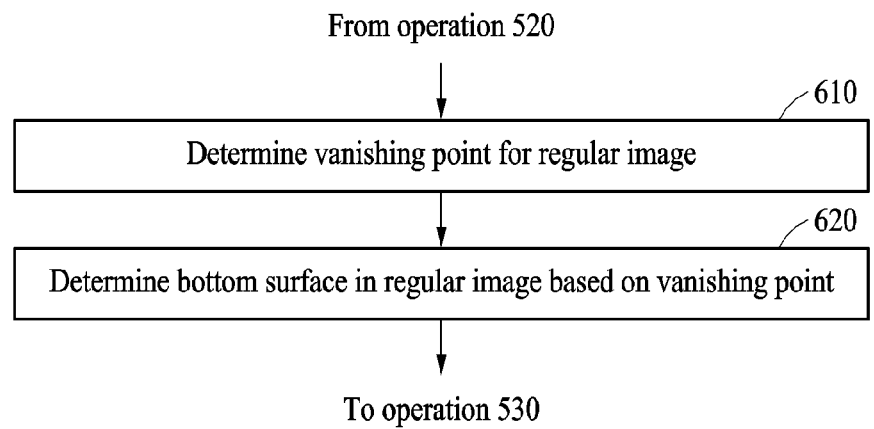
FIG. 6 is a flowchart illustrating a method of determining a bottom surface in a regular image according to an example embodiment.

FIG. 6 is a flowchart illustrating a method of determining a bottom surface in a regular image according to an example embodiment.

According to an example embodiment, after operation 520 described above with reference to FIG. 5 is performed, following operations 610 and 620 may be further performed.

In operation 610, the electronic apparatus 400 may determine a vanishing point for a regular image. According to another example embodiment, in response to the vanishing point not appearing, the electronic apparatus 400 may determine a height in the regular image corresponding to a height of a camera.

In operation 620, the electronic apparatus 400 may determine a bottom surface in the regular image based on the vanishing point. For example, the regular image may be divided into two regions based on the vanishing point, and a lower region of the two regions may be determined to be the bottom surface.

According to an example embodiment, in response to first coordinates in the regular image designated by a user corresponding to the bottom surface, the electronic apparatus 400 may determine that the first coordinates correspond to some points in a bottom surface in an actual space.

According to another example embodiment, when the first coordinates in the regular image designated by the user correspond to the bottom surface and are associated with an additional input (e.g., a bottom surface shift input), the electronic apparatus 400 may determine that the first coordinates correspond to a point positioned in air above the bottom surface in the actual space, which is a point positioned in a virtual shift plane parallel to the bottom surface.

Figure 7:
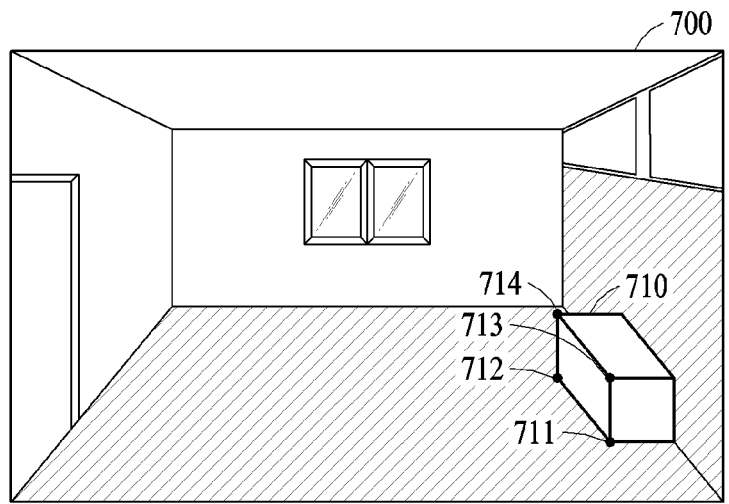
FIG. 7 illustrates an object positioned in a regular image according to an example embodiment.

FIG. 7 illustrates an object positioned in a regular image according to an example embodiment.

According to an example embodiment, a regular image 700 may include an object 710. For example, a user may desire to calculate a length of each side of the object 710, an area of one surface of the object 710, or a volume of the object 710 through the regular image 700.

According to an example embodiment, the user may input first coordinates 711 and second coordinates 712 to the electronic apparatus 400 to calculate an actual distance between actual points indicated by the first coordinates 711 and the second coordinates 712 of the object 710. The first coordinates 711 and the second coordinates 712 may be coordinates in a bottom surface. The electronic apparatus 400 may calculate the actual distance between the actual points indicated by the first coordinates 711 and the second coordinates 712 by calculating first world coordinates and second world coordinates for the actual points corresponding to the first coordinates 711 and the second coordinates 712 and calculating a distance between the first world coordinates and the second world coordinates.

According to another example embodiment, the user may input the first coordinates 711 and third coordinates 713 to the electronic apparatus 400 to calculate an actual distance between actual points indicated by the first coordinates 711 and the third coordinates 713 of the object 710. The third coordinates 713 may be coordinates positioned in air above the bottom surface. The user may input an additional input (e.g., a bottom surface shift input) to the electronic apparatus 400 to indicate that the third coordinates 713 are coordinates positioned in the air above the bottom surface. In response to receiving the third coordinates 713 together with the additional input, the electronic apparatus 400 may calculate third world coordinates corresponding to the third coordinates 713. For example, an actual point indicated by the third coordinates 713 may be positioned in a vertical direction from an actual point indicated by the first coordinates 711. In this example, the third world coordinates may have the same x-axis and y-axis coordinates as the first world coordinates, and may have a different z-axis coordinate than the first world coordinates. The actual distance between the actual points indicated by the first coordinates 711 and the third coordinates 713 may be calculated based on the first world coordinates and the third world coordinates.

According to another example embodiment, the user may input the third coordinates 713 and fourth coordinates 714 to the electronic apparatus 400 to calculate an actual distance between actual points indicated by the third coordinates 713 and the fourth coordinates 714 of the object 710. The third coordinates 713 and the fourth coordinates 714 may be coordinates positioned in the air above the bottom surface. In response to respectively receiving the third coordinates 713 and the fourth coordinates 714 together with the additional input, the electronic apparatus 400 may respectively calculate the third world coordinates and fourth world coordinates respectively corresponding to the third coordinates 713 and the fourth coordinates 714. The actual distance between the actual points indicated by the third coordinates 713 and the fourth coordinates 714 may be calculated based on the third world coordinates and the fourth world coordinates.

An example embodiment in which the user inputs coordinates for the regular image is described with reference to FIG. 7, but this embodiment is merely one example. As another example, the user may input coordinates for an original image, and the electronic apparatus 400 may convert the original image into the regular image and perform the above-described coordinate calculation.

Figure 8:
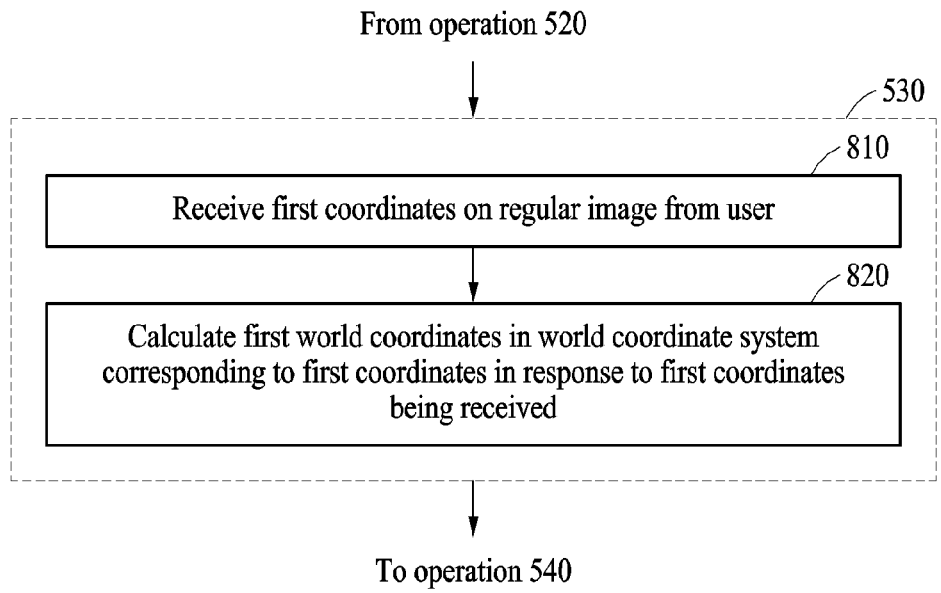
FIG. 8 is a flowchart illustrating a method of calculating world coordinates of coordinates positioned in a bottom surface of a regular image according to an example embodiment.

FIG. 8 is a flowchart illustrating a method of calculating world coordinates of coordinates positioned in a bottom surface of a regular image according to an example embodiment.

According to an example embodiment, operation 530 described above with reference to FIG. 5 may include following operations 810 and 820. According to another example embodiment, operation 540 may include following operations 810 and 820.

In operation 810, the electronic apparatus 400 may receive first coordinates in a regular image from a user. For example, in response to providing the regular image to the user, the electronic apparatus 400 may directly receive the first coordinates in the regular image from the user. As another example, in response to providing an original image to the user, the electronic apparatus 400 may receive, from the user, initial coordinates in the original image and the first coordinates by converting the initial coordinates into coordinates in the regular image. The received first coordinates in the regular image may be coordinates in a bottom surface.

In operation 820, in response to receiving the first coordinates, the electronic apparatus 400 may calculate first world coordinates in a world coordinate system corresponding to the first coordinates. Because a camera coordinate system and the world coordinate system are matched in advance, the electronic apparatus 400 may calculate the first world coordinates by changing the first coordinates in the camera coordinate system to coordinates in the world coordinate system.

According to an example embodiment, when both the first coordinates and second coordinates (e.g., the first coordinates 711 and the second coordinates 712 of FIG. 7) in the regular image received from the user are positioned in the bottom surface, operations 810 and 820 may be respectively performed for the first coordinates and the second coordinates. Regarding the above-described example embodiment, the first world coordinates and second world coordinates having a z-axis value of "0" in the world coordinate system may be calculated. An actual distance between actual points indicated by the first coordinates and the second coordinates may be calculated based on the first world coordinates and the second world coordinates.

Figure 9:
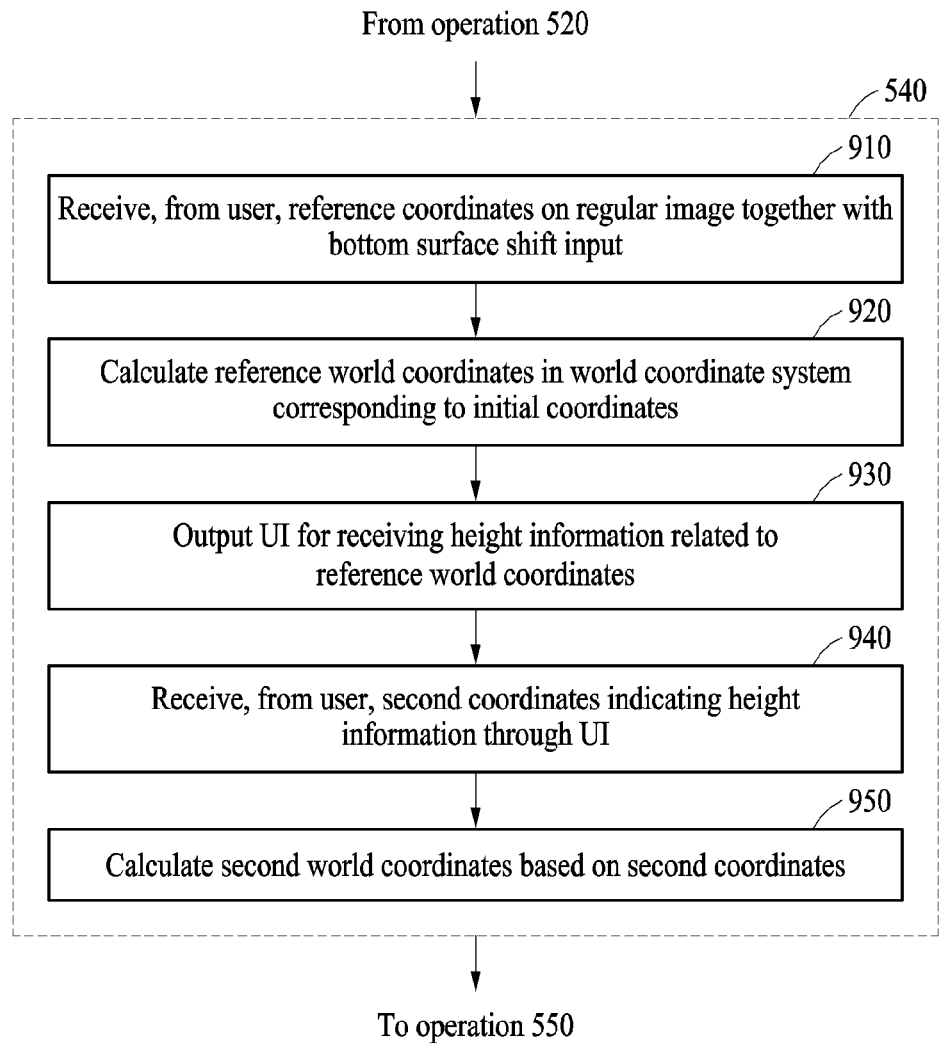
FIG. 9 is a flowchart illustrating a method of calculating world coordinates of coordinates positioned in air above a bottom surface of a regular image according to an example embodiment.

FIG. 9 is a flowchart illustrating a method of calculating world coordinates of coordinates positioned in air above a bottom surface of a regular image according to an example embodiment.

According to an example embodiment, operation 540 described above with reference to FIG. 5 may include following operations 910 through 950. According to another example embodiment, operation 530 may include following operations 910 through 950.

In operation 910, the electronic apparatus 400 may receive, from a user, reference coordinates on a regular image together with a bottom surface shift input (or after the bottom surface shift is input) as an additional input. For example, the user may input the additional input to the electronic apparatus 400 to indicate that the reference coordinates are not final input coordinates. For example, the additional input may be a predetermined key input (e.g., a shift key) of a keyboard. The reference coordinates may be coordinates in a bottom surface.

In operation 920, the electronic apparatus 400 may calculate reference world coordinates in a world coordinate system corresponding to the reference coordinates.

In operation 930, the electronic apparatus 400 may output a user interface (UI) for receiving height information related to the reference world coordinates. For example, the UI may be a graphic effect. When the UI is output, the user may recognize that a current state is a state in which the height information related to the reference coordinates may be input.

According to an example embodiment, the UI may be output so that the user may adjust a length of the UI in a height direction. For example, the length of the UI is adjustable in a z-axis direction based on the world coordinate system. The user may locate the UI on desired second coordinates on the regular image by adjusting the length of the UI.

In operation 940, the electronic apparatus 400 may receive the second coordinates indicating the height information from the user through the UI. The user may input the second coordinates of the regular image through the UI output on the regular image. The user may input that the second coordinates are positioned in a vertical direction from the reference coordinates by selecting the desired second coordinates.

In operation 950, the electronic apparatus 400 may calculate second world coordinates corresponding to the second coordinates based on the received second coordinates.

According to an example embodiment, an x-axis coordinate and a y-axis coordinate of the second world coordinates corresponding to the received second coordinates may be same as an x-axis coordinate and a y-axis coordinate of the reference world coordinates, respectively, and a z-axis coordinate of the second world coordinates may be different from a z-axis coordinate of the reference world coordinates. Accordingly, the electronic apparatus 400 may set the x-axis coordinate and the y-axis coordinate of the second world coordinates to have the x-axis coordinate and the y-axis coordinate of the reference world coordinates to calculate the second world coordinates and calculate the z-axis coordinate of the second world coordinates based on the second coordinates.

Through operations 910 through 950, world coordinates in the world coordinate system for coordinates (e.g., the second coordinates 712) positioned in the air above a bottom surface of the regular image may be calculated.

According to an example embodiment, when both the first coordinates and second coordinates of the regular image received from the user are coordinates (e.g., the third coordinates 713 and the fourth coordinates 714) positioned in the air above the bottom surface, operations 910 through 950 may be performed for each of operations 530 and 540.

Figure 10:
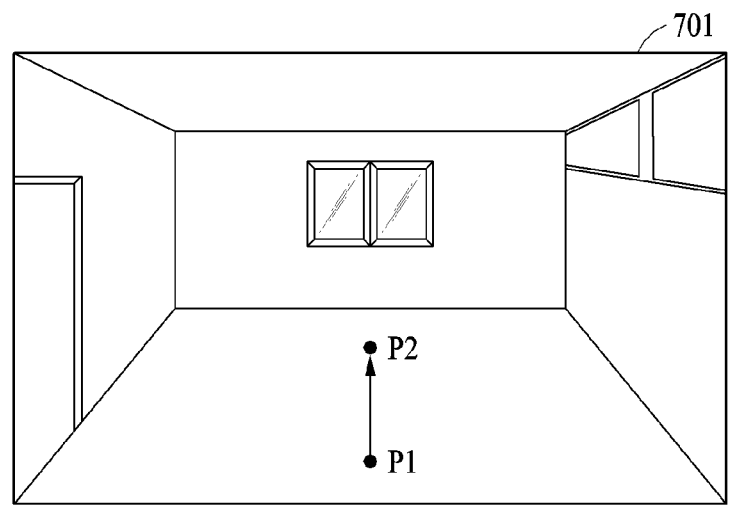
FIG. 10 illustrates an example in which an input of a user occurs in a regular image.
Figure 11:
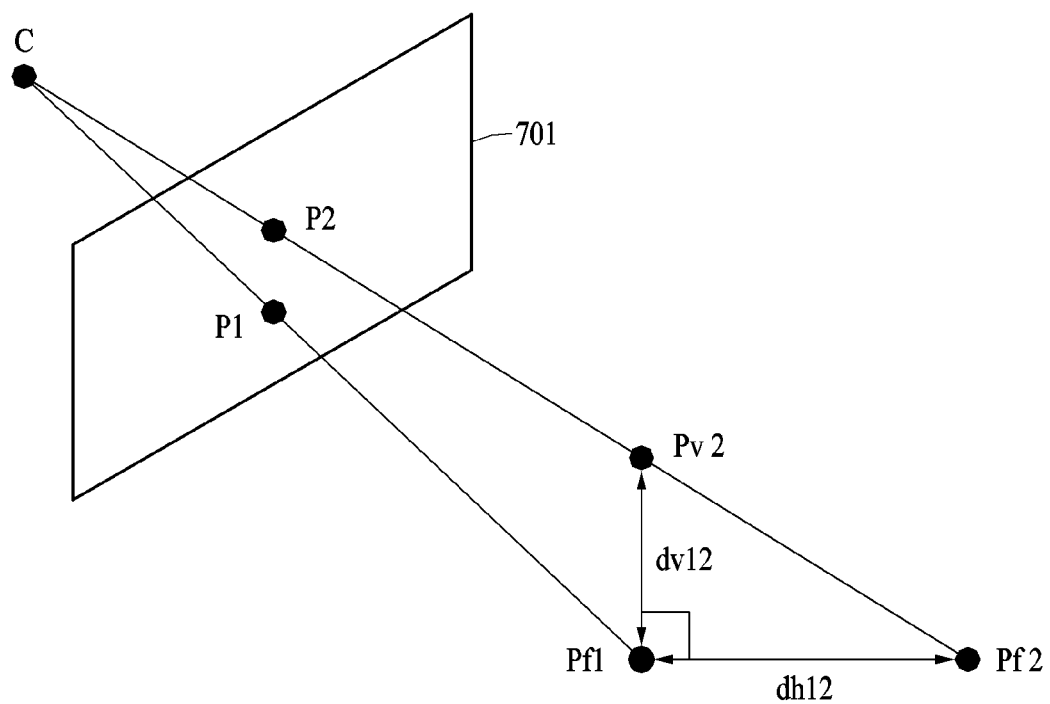
FIG. 11 illustrates a method of calculating coordinates according to how the input is entered by the user in the example of FIG. 10 according to an example embodiment.

FIG. 10 illustrates an example in which an input of a user occurs in a regular image, and FIG. 11 illustrates a method of calculating coordinates according to how the input is entered by the user in the example of FIG. 10 according to an example embodiment.

According to an example embodiment, as illustrated in FIG. 10, a user may input two points, that is, two sets of coordinates (e.g., first coordinates P1 and second coordinates P2), from which a distance is to be measured through the regular image 701.

When the user inputs the first coordinates P1 on the regular image, as illustrated in FIG. 11, the electronic apparatus 400 may calculate first world coordinates Pf1 in a world coordinate system corresponding to the first coordinates P1 of the regular image 701.

Then, as an example, when the user inputs the second coordinates P2 on the regular image, the electronic apparatus 400 may calculate second world coordinates Pf2 in the world coordinate system corresponding to the second coordinates P2 of the regular image 701. In this example, because a bottom surface shift input is not entered by the user, both the first world coordinates Pf1 and the second world coordinates Pf2 may be points on the bottom surface, and a distance dh12 between the two points may be calculated as a distance in a same horizontal plane.

As another example, when the second coordinates P2 on the regular image is entered by the user together with the bottom surface shift input, the electronic apparatus 400 may set second world coordinates Pv2 positioned in a vertical direction from the first world coordinates Pf1. The electronic apparatus 400 may set the second world coordinates Pv2 to have the same x-axis and y-axis coordinates as the first world coordinates Pf1 and to have a z-axis coordinate that is increased by dv12. In this example, the first world coordinates Pf1 and the second world coordinates Pv2 may be present on a plane perpendicular to the bottom surface.

In the above description, a pixel distance between the first coordinates P1 and the second coordinates P2 may remain the same in the regular image 701. However, the pixel distance may be calculated differently as dh12, the distance in a bottom surface plane in the world coordinate system, and dv12, the vertical distance in the world coordinate system, depending on whether there is the bottom surface shift input. As such, the electronic apparatus 400 may calculate the pixel distance as a vertical distance between two points in response to the bottom surface shift input being present and may calculate the pixel distance as a horizontal distance between two points positioned on the same bottom surface plane in response to the bottom surface shift input being absent. Vertical distance calculation may be understood from the description provided above with reference to FIG. 3.

According to an example embodiment, shooting conditions of a camera may be preset. That is, a height ($h_{cam}$ illustrated in FIG. 3) and a shooting angle of the camera may be set to remain the same while shooting is being processed. For example, the height and the shooting angle of the camera may remain the same by shooting using a tripod with fixed shooting angle and height, and accordingly, a vanishing point or a vanishing line may be uniformly formed in an original image or the regular image. In this example embodiment, the electronic apparatus 400 may store information about a horizontal distance or a vertical distance per pixel at each position in the original image or the regular image in advance. One pixel at each position may have a horizontal distance and a vertical distance, which are different from each other, based on the vanishing point or the vanishing line, and the electronic apparatus 400 may calculate or receive and store the horizontal distance and the vertical distance in advance. For example, in the examples illustrated in FIGS. 10 and 11, the electronic apparatus 400 may store data about dh12, the horizontal distance per pixel on a bottom surface plane from the first coordinates P1, and dv12, the vertical distance per pixel on a vertical plane perpendicular to the bottom surface, and the data may include, for example, a distance value per pixel or a distance increase or decrease value for a distance value of a previous pixel per pixel. Horizontal and vertical distances of one pixel may be different from those of another pixel, and thus, a horizontal distance per pixel and a vertical distance per pixel may be stored separately.

According to an example embodiment, the electronic apparatus 400 may calculate a difference between a vanishing point or a vanishing line set according to the preset shooting conditions and a vanishing point or a vanishing line derived from the original image and set a correction weight depending on the calculated difference. The calibration weight may be calculated to be increased in proportion to the difference between the vanishing points or the vanishing lines. The electronic apparatus 400 may correct a distance error caused by an error in the shooting conditions by applying the correction weight to the above-described data, the data about the horizontal distance per pixel on the bottom surface plane and the vertical distance per pixel on the vertical plane perpendicular to the bottom surface from each position.

Figure 12:
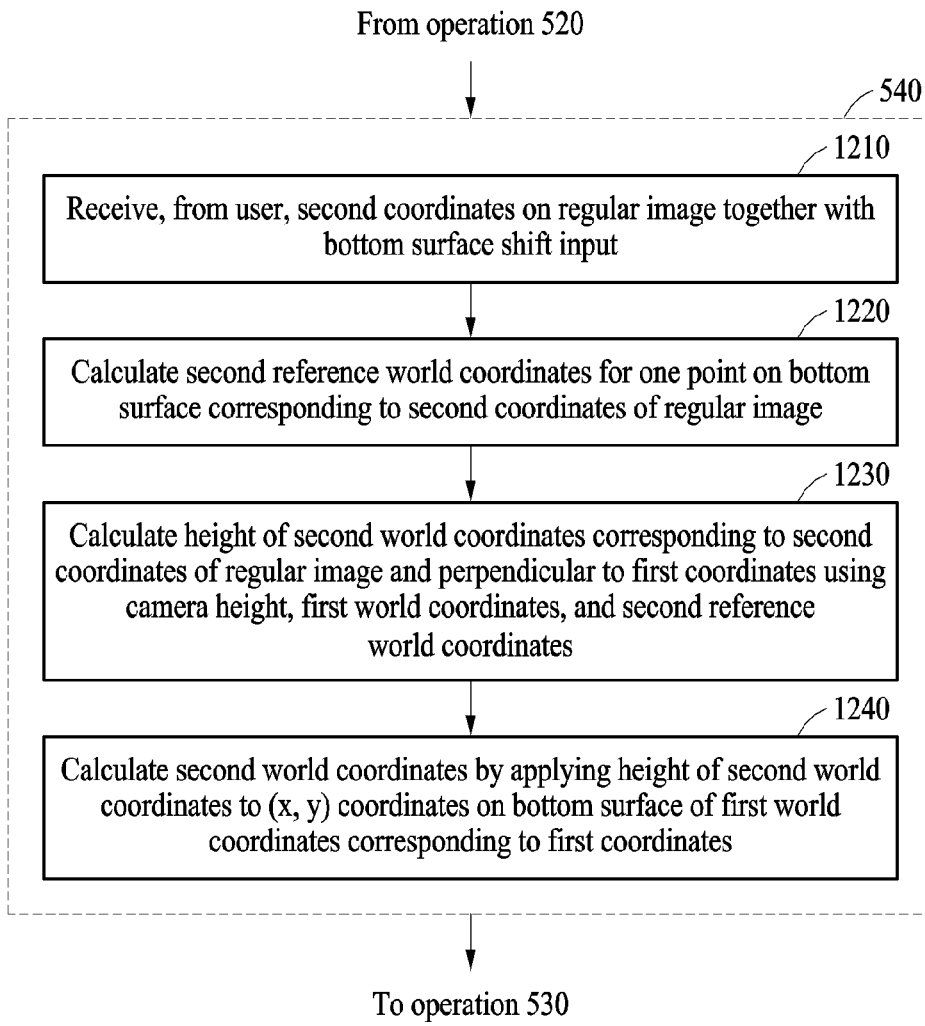
FIG. 12 is a flowchart illustrating a method of calculating world coordinates of coordinates positioned in air above a bottom surface of a regular image according to an example embodiment.

FIG. 12 is a flowchart illustrating a method of calculating world coordinates of coordinates positioned in air above a bottom surface of a regular image according to an example embodiment. Another example illustrated in FIG. 12 relates to an example embodiment in which the electronic apparatus 400 directly calculates height information on a height of second coordinates.

According to an example embodiment, operation 540 described above with reference to FIG. 5 may include following operations 1210 through 1240.

In operation 1210, the electronic apparatus 400 may receive, from a user, second coordinates on a regular image as an input for the second coordinates together with a bottom surface shift input (or after the bottom surface shift is input). For example, the bottom surface shift input may be a predetermined key input (e.g., a shift key).

In operation 1220, the electronic apparatus 400 may calculate second reference world coordinates for one point on a bottom surface corresponding to the second coordinates of the regular image. Referring to the example illustrated in FIG. 11, the electronic apparatus 400 may calculate world coordinates of the second reference coordinates Pf2 obtained by projecting the second coordinates P2 onto the bottom surface. The world coordinates of the second reference coordinates Pf2 may be used to calculate the distance dh12 between the first coordinates P1 and the second reference coordinates Pf2 on a bottom surface plane. In addition, the distance dh12 on the bottom surface plane may be used to calculate height information dv12 on the height of the second coordinates.

In operation 1230, the electronic apparatus 400 may calculate the height dv12 of the second world coordinates using a camera height $H_{cam}$, the first world coordinates Pf1, and the second reference world coordinates Pf2. The second world coordinates Pv2 may correspond to the second coordinates of the regular image, be perpendicular to the first world coordinates Pf1, and be vertically spaced apart by the height dv12. The calculation of the height dv12 of the second world coordinates may be easily understood from the above description provided with reference to FIG. 3.

In operation 1240, the electronic apparatus 400 may identify coordinates, (x,y) coordinates, of the first world coordinates on the bottom surface plane and calculate the second world coordinates by applying the height dv12 of the second world coordinates to the coordinates of the first world coordinates.

Figure 13:
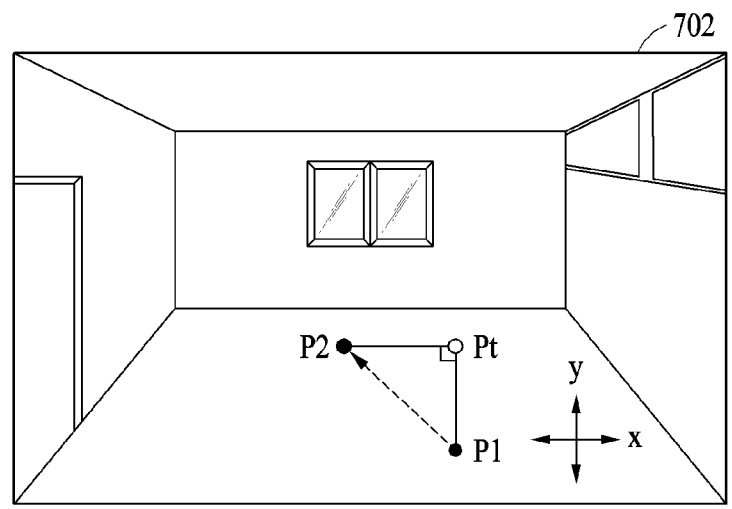
FIG. 13 illustrates an example in which an input of a user occurs in a regular image.
Figure 14:
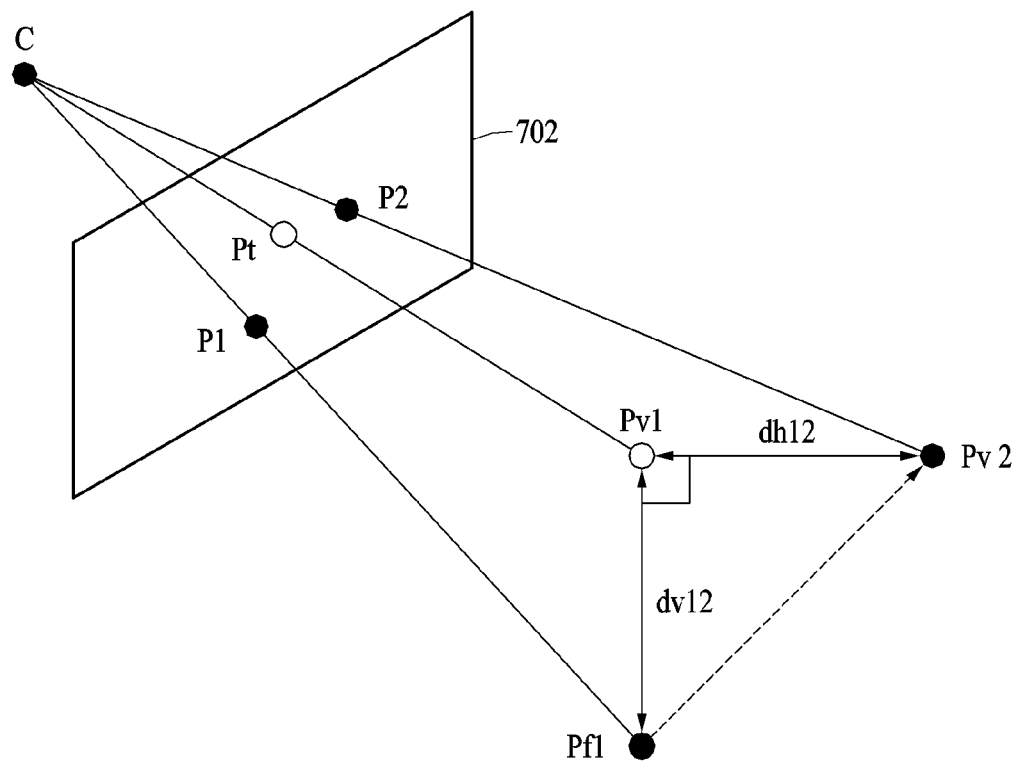
FIG. 14 illustrates a method of calculating coordinates according to how the input is entered by the user in the example of FIG. 13 according to an example embodiment.

FIG. 13 illustrates an example in which an input of a user occurs in a regular image, and FIG. 14 illustrates a method of calculating coordinates according to how the input is entered by the user in the example of FIG. 13 according to an example embodiment.

According to an example embodiment, as illustrated in FIG. 13, a user may input two points, that is, two sets of coordinates (e.g., first coordinates P1 and second coordinates P2), from which a distance is to be measured through the regular image 701. The first coordinates P1 relate to a point in a bottom surface in a world coordinate system, and the second coordinates P2 relate to a point having a predetermined height from the bottom surface in the world coordinate system and having an x-axis coordinate and a y-axis coordinate, one of which is different from that of the first coordinates in the world coordinate system.

When the user inputs the first coordinates P1 on the regular image, the electronic apparatus 400 may calculate first world coordinates Pf1 in the world coordinate system corresponding to the first coordinates P1 of the regular image 701 as described above.

Thereafter, for example, when the user inputs the second coordinates P2 on the regular image together with a bottom surface shift input, the electronic apparatus 400 may calculate the second world coordinates Pv2 having a height dv12 from the bottom surface and spaced apart by a distance dh12 from the first coordinates on a horizontal plane.

Figure 15:
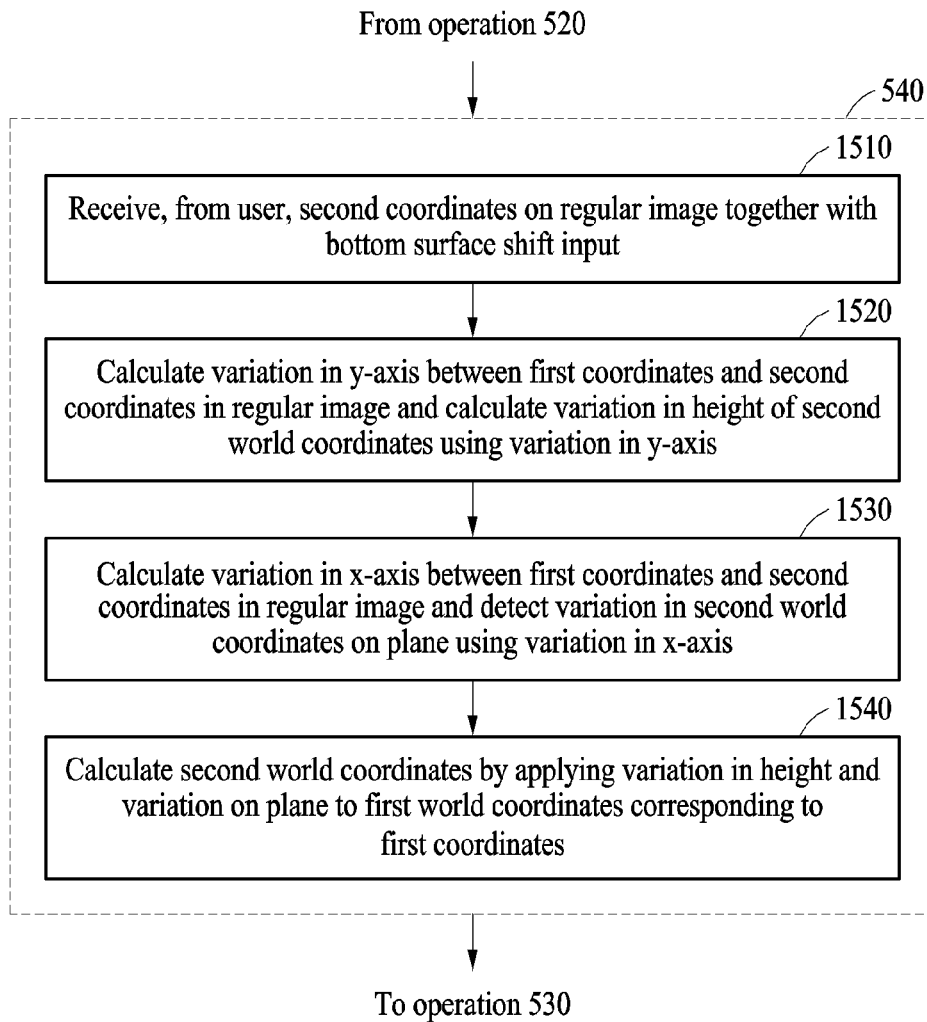
FIG. 15 is a flowchart illustrating a method of calculating world coordinates of coordinates positioned in air above a bottom surface of a regular image according to another example embodiment, and a method of calculating second world coordinates (Pv2) is further described with reference to FIG. 15.

FIG. 15 is a flowchart illustrating a method of calculating world coordinates of coordinates positioned in air above a bottom surface of a regular image according to another example embodiment, and a method of calculating second world coordinates (Pv2) is described with reference further to FIG. 15.

According to an example embodiment, operation 540 described above with reference to FIG. 5 may include following operations 1510 through 1540.

In operation 1510, the electronic apparatus 400 may receive, from a user, second coordinates on a regular image as an input for the second coordinates together with a bottom surface shift input (or after the bottom surface shift is input). For example, the bottom surface shift input may be a predetermined key input (e.g., a shift key). As in the examples of FIGS. 13 and 14, the first coordinates P1 relate to a point in a bottom surface in a world coordinate system. The second coordinates P2 may have a predetermined height from the bottom surface in the world coordinate system, and at least one of an x-axis coordinate and a y-axis coordinate of the second coordinates P2 may be different from that of the first coordinates.

In operation 1520, the electronic apparatus 400 may calculate a variation in a height in the world coordinate system based on a variation in a vertical direction (a variation in a y-axis based on two-dimensional (2D) coordinate axes x-y of the regular image illustrated in FIG. 13) in the regular image. That is, when the electronic apparatus 400 receives the bottom surface shift input as an input for the second coordinates from the user, the variation in the y-axis in the regular image may be calculated in relation only to a variation in a height dv12 in the world coordinate system. A detailed calculation method may be understood from the description provided with reference to FIG. 13.

In operation 1530, the electronic apparatus 400 may calculate a variation dh12 on a plane in the world coordinate system based on a horizontal variation amount (the variation in the y-axis based on the 2D coordinate axes x-y of the regular image illustrated in FIG. 13) between the first coordinates and the second coordinates in the regular image. That is, a variation in an x-axis between the first coordinates and the second coordinates in the regular image may be calculated in relation only to a variation in a plane (a variation in an x-axis and a y-axis in the world coordinate system) between the first world coordinates and the second world coordinates on a same plane in the world coordinate system. The variation calculation on the same plane may be understood from the description provided with reference to FIGS. 2 through 9.

In operation 1540, the electronic apparatus 400 may calculate the second world coordinates for the second coordinates by applying the variation in the height and the variation on the plane to the first world coordinates (x,y,z) for the first coordinates.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example examples, or vice versa.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic apparatus for performing a method of calculating an actual distance between coordinates in an image, the electronic apparatus comprising:
    a memory configured to store a program that calculates an actual distance between coordinates in an image; and
    a processor configured to execute the program
    wherein the processor is configured to:
    generate a regular image for an original image captured by a camera based on an intrinsic parameter of the camera and pose information of the camera;
    calculate, based on first coordinates in the regular image, first world coordinates corresponding to the first coordinates in a preset world coordinate system;
    calculate, based on second coordinates in the regular image, second world coordinates corresponding to the second coordinates in the world coordinate system; and
    calculate a distance between the first world coordinates and the second world coordinates,
    wherein the processor is further configured to:
    receive reference coordinates on the regular image together with a bottom surface shift input from the user,
    calculate reference world coordinates in the world coordinate system corresponding to the reference coordinates when the bottom surface shift input and the reference coordinates are received,
    output a user interface (UI) for receiving height information about the reference world coordinates,
    receive the second coordinate representing the height information from the user through the UI, and
    calculate the second world coordinate corresponding to the second coordinate,
    wherein the reference world coordinates and the second world coordinates have a same plane position and different heights in the world coordinate system.

2. The electronic apparatus of claim 1, wherein
    the first coordinates are positioned in a bottom surface in the regular image, and
    the second coordinates are positioned in air above the bottom surface.

3. The electronic apparatus of claim 1, wherein the processor is further configured to:
    determine a vanishing point for the regular image; and determine a bottom surface in the regular image based on the vanishing point, wherein the first coordinates and the reference coordinates are included in the bottom surface.

4. The electronic apparatus of claim 1, wherein the processor is further configured to:

calculate, based on third coordinates in the regular image, third world coordinates corresponding to the third coordinates in the world coordinate system; and calculate an area of a geometric structure formed by the first world coordinates, the second world coordinates, and the third world coordinates.

5. The electronic apparatus of claim 1, wherein the processor is further configured to:

calculate, based on third coordinates and fourth coordinates in the regular image, third world coordinates corresponding to the third coordinates and fourth world coordinates corresponding to the fourth coordinates in the world coordinate system; and calculate a volume of a geometric structure formed by the first world coordinates, the second world coordinates, the third world coordinates, and the fourth world coordinates.

6. The electronic apparatus of claim 1, wherein the original image is a panorama image or a 360-degree image.

\* \* \* \* \*